(12) United States Patent
Della-Libera et al.

(10) Patent No.: US 8,176,085 B2
(45) Date of Patent: May 8, 2012

(54) MODULAR FOREST AUTOMATA

(75) Inventors: Giovanni M. Della-Libera, Seattle, WA (US); Steven E. Lucco, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 641 days.

(21) Appl. No.: 12/242,322

(22) Filed: Sep. 30, 2008

(65) Prior Publication Data

US 2010/0094906 A1   Apr. 15, 2010

(51) Int. Cl.
*G06F 7/00* (2006.01)
*G06F 17/30* (2006.01)
(52) U.S. Cl. ........................................ 707/797
(58) Field of Classification Search .............. 707/797, 707/808
See application file for complete search history.

(56) References Cited

U.S. PATENT DOCUMENTS

| | | | |
|---|---|---|---|
| 5,317,509 A | 5/1994 | Caldwell | |
| 5,915,259 A | 6/1999 | Murata | |
| 5,946,490 A | 8/1999 | Lieberherr et al. | |
| 6,785,643 B2 | 8/2004 | Hayosh et al. | |
| 7,055,093 B2 | 5/2006 | Tozawa et al. | |
| 7,058,937 B2 | 6/2006 | Fu et al. | |
| 7,093,231 B2 | 8/2006 | Nuss | |
| 7,240,048 B2 | 7/2007 | Pontius | |
| 2004/0260683 A1* | 12/2004 | Chan et al. | 707/3 |
| 2005/0027681 A1* | 2/2005 | Bernstein et al. | 707/1 |
| 2005/0097453 A1 | 5/2005 | Simonyi | |
| 2005/0278781 A1* | 12/2005 | Zhao et al. | 726/22 |
| 2006/0167915 A1 | 7/2006 | Furlong et al. | |
| 2006/0242197 A1 | 10/2006 | Tsyganskiy | |
| 2006/0282422 A1 | 12/2006 | Al-Omari | |
| 2007/0006071 A1 | 1/2007 | Erman | |
| 2007/0006151 A1 | 1/2007 | Conway et al. | |
| 2008/0071802 A1 | 3/2008 | Lucco | |

OTHER PUBLICATIONS

"Visibly Pushdown Automata for Streaming XML," by Viraj Kumar, P. Madhusudan and Mahesh Viswanathan, University of Illinois at Urbana-Champaign, Urbana, Illinois, pp. 1053-1062 [online] [retrieved on Dec. 13, 2007]. Retrieved from the Internet: http://www2007.org/papers/paper788.pdf.

"SAFT: Static Analysis with Finite Tree Automata," by Author Unknown, Danish Natural Science Research Counsel, 1 pg. [online] [retrieved on Dec. 13, 2007]. Retrieved from the Internet: http://akira.ruc.dk/~jpg/SAFT/home.html.

"Abstract Interpretation over Non-Deterministic Finite Tree Automata for Set-Based Analysis of Logic Programs," by John P. Gallagher and German Puebla, University of Bristol, Department of Computer Science, Bristol, UK, 17 pgs. [online] [retrieved on Dec. 13, 2007]. Retrieved from the Internet: http://www.clip.dia.fi.upm.es/papers/set-based-absint-padl.pdf.

"Automata Theory for XML Researchers," by Frank Neven, University of Limburg, Diepenbeek, Belgium, 8 pgs. [online] [retrieved on Dec. 13, 2007]. Retrieved from the Internet: http://www.cs.earlham.edu/~theory/papers/sr.pdf.

* cited by examiner

*Primary Examiner* — Hosain Alam
*Assistant Examiner* — Van Oberly
(74) *Attorney, Agent, or Firm* — Workman Nydegger (57) ABSTRACT

Modular forest automata (MFA) provide a unified description of partially-ordered regular tree patterns. MFAs provide simple methods for determinization, sub-typing, intersection, and complementation of these patterns. MFAs support high-performance pattern analysis and matching. Modular forest transducers, in conjunction with modular forest automata, enable compilers to place semantic actions on any state transition while supporting efficient transformation of labeled, directed graphs.

12 Claims, 6 Drawing Sheets

MODULAR FOREST AUTOMATA

CROSS-REFERENCE TO RELATED APPLICATIONS

N/A

BACKGROUND

Programming languages can use patterns to distinguish among classes of values. For example, the following two lines of pseudo-code define a function that computes the sum of a list of integers.

```
Sum(nil) = 0;
Sum(cons[head,tail]) = head+Sum(tail);
```

The patterns in this example serve two purposes. First, they distinguish among input cases. Second, they enable concise value deconstruction through the use of pattern variables and type inference.

Patterns are closely related to structural types. The regular tree patterns described herein are regular tree types that may also include variable bindings. A tree pattern coupled with a semantic action is called a tree transformation rule.

Structural type systems, such as XML schema languages, define categories of values. Programming languages often use structural type systems to statically check program safety properties. SQL databases also use a type system that is primarily focused on structure. Tables that result from joins, for example, contain tuples that can be described as having an anonymous structural type. Database management systems require that a variety of programs can interpret the data stored in the system. Structural type systems help database management systems meet this requirement.

Distributed systems also induce a requirement for structural types. Due to latency, messages exchanged among distributed program components are often larger and more complex than method parameters exchanged among objects.

The values stored in databases and exchanged among distributed components are intermediate in complexity between the simple values manipulated by program expressions and the complexity of a Turing Machine. Described herein, regular tree patterns are used to define these intermediate levels of structural complexity.

Expressing and analyzing both ordered and unordered regular tree patterns would be useful and beneficial abilities. Examples of domains in which analysis would beneficially be improved include model checking and authorization logic which uses partially-ordered tree patterns. Certain existing languages, such as XML schema, may use partially ordered regular trees but currently lack a means for sub-typing. Further, such languages may impose semantic restrictions in order to support efficient implementation under currently known methods.

Some work on greedy regular expression matching and the programming language XStatic has explored how to incorporate regular ordered tree types into object-oriented languages. Like XDuce, XStatic uses a uniform representation for sequences. Such work maps regular ordered tree types to objects, but uses flattening to support the natural semantics of regular language inclusion. Finally, trx explores regular ordered tree types in the context of Scheme.

Some work has also been accomplished on pushdown forest automata (PFAs). However, PFAs do not provide a sub-typing algorithm or a mechanism for addressing unordered nests (multisets).

BRIEF SUMMARY

Embodiments of the present invention relate to modular forest automata (MFA). Modular forest automata, described herein, can be used to describe and analyze regular tree patterns and modular forest transducers (MFTs) can be created that can concisely express the transformation of labeled directed graphs. Graph transformation is a basic ingredient in the implementation of logics, process models, and programming languages. Implementations of modular forest automata may be used to support high-performance, strongly typed graph transformation.

Modular forest automata are a mechanism for defining, reorganizing, and transforming collections of partially-ordered, finite, unranked trees. MFAs support the analysis and composition of MFA hierarchies. MFAs provide a unified treatment of ordered and unordered tree patterns.

Embodiments described herein include methods, systems, and computer program products for analyzing regular tree patterns. Particular embodiments allow for data being received which can be determined or rewritten as modules (machines) describing both sequences and sets. A union may be created from the modules which are determined from the received data. Determined modules and unions of modules may comprise labeled acceptance states. From the labeled acceptance states, sub-type relationships may be determined for the modules.

Other embodiments described herein also include methods, systems, and computer program products for expressing a transformation of regular tree patterns. A regular tree pattern may be received and particular instance data may be received. A transducer may be compiled from the received regular tree pattern. Transducer transitions may be augmented with instructions which correspond to a desired transformation. From the augmented transducer transitions and the instance data, a correspondence between elements of the regular tree pattern and elements of the instance data may be determined.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Embodiments described herein relate to methods, systems, and computer program products for analyzing regular tree patterns. Additional embodiments described herein relate to methods, systems, and computer program products for expressing a transformation or transformations of regular tree patterns. The embodiments of the present invention may comprise a special purpose or general-purpose computer including various computer hardware, as discussed in greater detail below.

Figure 1:
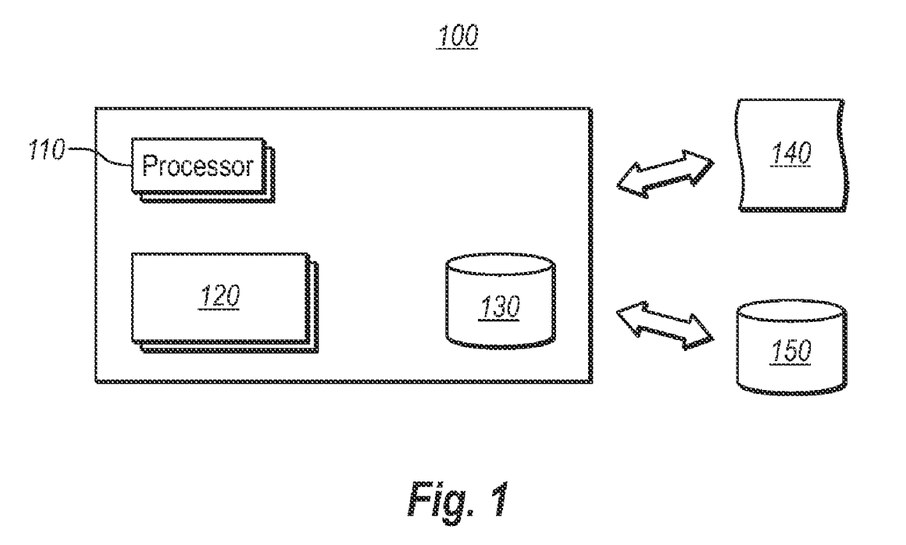
FIG. 1 illustrates a computing environment in which embodiments of the principles of the present invention may operate.

FIG. 1 describes an example computing environment 100 in which the embodiments described herein may be practiced. The computing environment 100 includes one or more computer processors 110. The computing environment 100 also includes one or more instances of computer memory 120. The computer memory 120 may be any computer-readable memory as known to be suitable and includes (but is not limited to) RAM, SRAM, and flash. Computer memory may also be persistent storage 130 such as a hard disc, solid state disc drives, CD ROM, DVDs, and the like. The computer memory 120 and storage 130 may, as may be suitable in any particular embodiment, be read only, such as ROM or a CD or DVD, or it may be both readable and writeable such as RAM, flash, and common disc drives.

The computing environment 100 also includes input and output 140. The input and output 140 may comprise any suitable format or media such as data stored on magnetic disc, data accessible via a network, or otherwise. The computing environment 100 also includes external persistent storage 150 to which and from which data may be transferred. Similar to storage 130, the external persistent storage 150 may take any suitable form such as magnetic disc, tape, CD-R/W, or otherwise.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise storage media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Such networks or communications connections are termed and referred to herein as communications media. Thus, any such connection is properly termed a computer-readable medium. Combinations of the above—including both storage media and communications media—should also be included within the scope of computer-readable media.

Computer-executable instructions comprise, for example, instructions and data which cause a general purpose computer, special purpose computer, or special purpose processing device to perform a certain function or group of functions. Such computer-executable instructions may be stored in computer memory 120, persistent storage 130, on any input or output media or device 140 or on external storage 150. Computer-executable instructions may also be transferred to a suitable computing environment via any suitable communications medium.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Embodiments described herein relate to methods, systems, and computer program products for analyzing regular tree patterns. Additional embodiments described herein relate to methods, systems, and computer program products for expressing a transformation of regular tree patterns. The embodiments of the present invention may comprise a special purpose or general-purpose computer including various computer hardware, as discussed in greater detail below.

Figure 8:
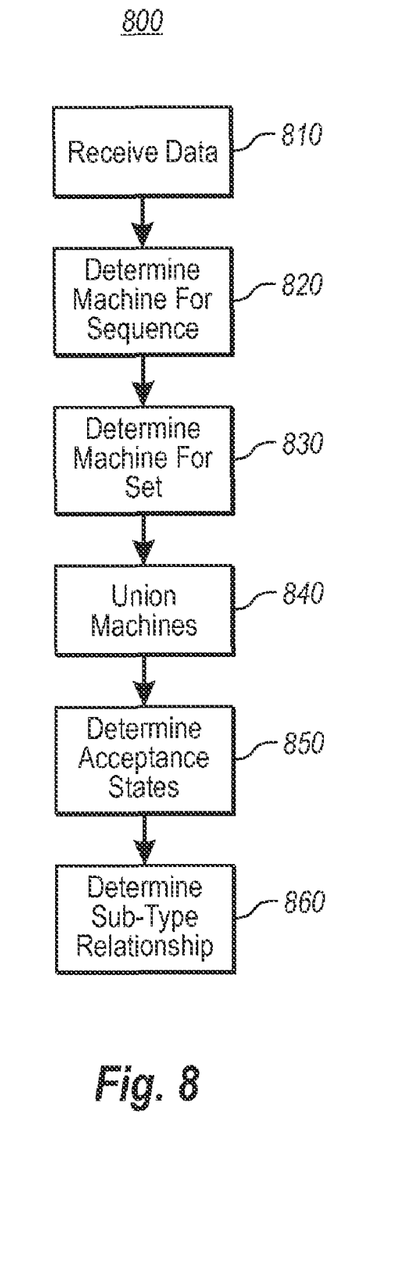
FIG. 8 illustrates a flowchart of a method for analyzing a regular tree pattern in accordance with particular embodiments of the present invention.

For example, FIG. 8 illustrates a method for analyzing a regular tree pattern. The method includes receiving data 810 comprising a regular tree pattern comprising at least one of a sequence and a set. When the tree pattern comprises a sequence, a machine is determined 820 which corresponds to the sequence. The determined machines are sometimes termed "modules." A sequence, as its name implies, is a set of elements which has a particular order.

When the tree pattern comprises a set, a machine is determined 830 which corresponds to the set. In contrast to a sequence which has a particular order, a set may be a collection of elements for which no particular order is specified.

A union is created 840 of the determined machines. From the union of the determined machines (modules), a set of labeled acceptance states is determined 850. Finally, a sub-type relationship is determined 860 from the labeled acceptance states.

As described more fully herein, a sub-type relationship may be one of equivalent, sub-type, super-type, disjoint, and intersecting. If two modules, $M_1$ and $M_2$, have the same acceptance states, then they are equivalent. If $M_1$ contains all the acceptance states of $M_2$ but not vice-versa, then $M_1$ is a super-type of $M_2$ and $M_2$ is a sub-type of $M_1$. If $M_1$ and $M_2$ have no acceptance states in common, the $M_1$ and $M_2$ are disjoint. If $M_1$ and $M_2$ share some acceptance states but each of $M_1$ and $M_2$ have acceptance state not shared by the other, then they are intersecting. The sub-type relationships are discussed in more detail below and in conjunction with FIG. 5.

Embodiments also include determining a root level machine (module) which comprises at least one transition to a labeled nest. A labeled nest, as described more fully herein, may have the form of Label[---] or Label{---}. A module may be created corresponding to the labeled nest. A continuation state which corresponds to a return from the labeled nest may be placed upon a stack. After placing the continuation state onto the stack, actions may be performed which correspond to the labeled nest. When an acceptance state is reached for the labeled nest, the continuation state is popped from the stack and processing is resumed for the root level machine.

Embodiments described herein may be employed wherein received data corresponds to data defining structural types in a programming language. Such data may be analyzed by the techniques described herein to determine if the structural types are equivalent, or have any of the other sub-type relationships as discussed herein.

Embodiments described herein may be employed wherein received data corresponds to data comprising schema and/or schema definitions for a database. Such data may be analyzed by the techniques described herein to determine if the schema and schema definitions are equivalent, or have some any of the other sub-type relationships.

Embodiments described herein may be employed wherein received data corresponds to XML schema. Such data may be analyzed by the techniques described herein to determine if the XML schema are equivalent, or have some any of the other sub-type relationships.

The embodiments described herein may be employed to determine structural and logical relationships corresponding to the determined sub-type relationships and applied for purposes of optimization, efficiency, and data translation for data structures in programming languages, databases, objects, and the like.

Figure 9:
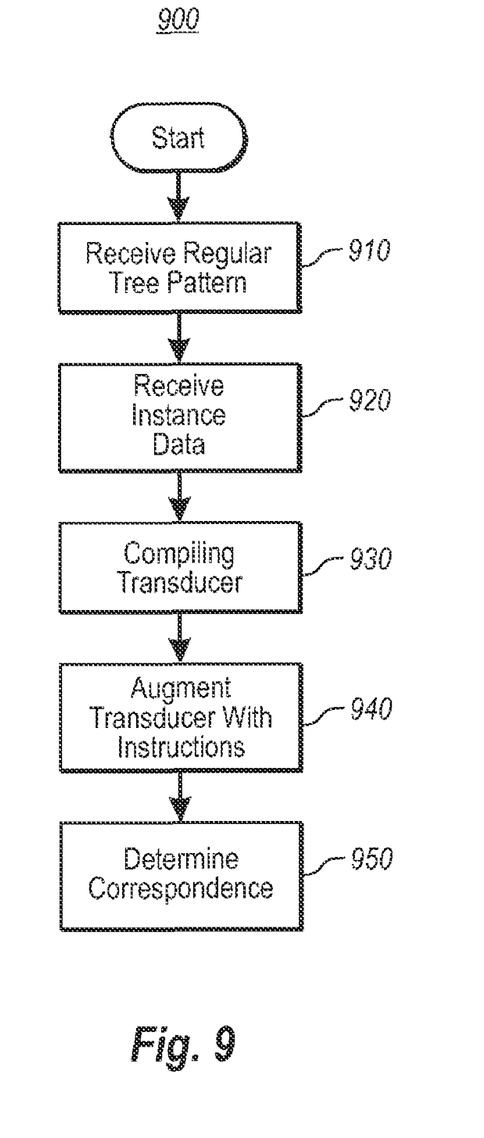
FIG. 9 illustrates a flowchart of a method for expressing the transformation of a regular tree pattern in accordance with particular embodiments of the present invention.

Embodiments described herein also include methods for expressing the transformation of a regular tree pattern. FIG. 9 illustrates a method 900 for expressing the transformation of a regular tree pattern. The method includes receiving first data 910 which corresponds to a regular tree pattern. The method also includes receiving second data 920 corresponding to an actual instance.

For example, data comprising a regular tree pattern may comprise an XML schema, may comprise a database schema, may comprise structural types for a programming language or object definitions. Data corresponding to an actual instance may comprise data within a database, may comprise a serial data input stream, or may comprise data embodied within object-oriented objects or structural types defined within a programming language.

The method 900 includes compiling the regular tree pattern into a transducer. Compiling a tree pattern is described in more detail in later sections of this description. Once compiled, the transducer transitions are augmented 940 with instructions corresponding to a desired transformation. After the transitions have been augmented with instructions, it may then be determined 950 from the augmented transitions and from the data corresponding to an actual instance a correspondence between elements of the instance and elements of the regular tree pattern.

For instance, there may be a pattern such as Root[A+, B*, C?] and actual instance data (given within an environment) of [aaa, bbb, –]. From this example, the method 900 may determine a particular binding such that A='aaa', B='bbb', and C='–'. Further, actions may be performed such as, for example, action: Root[A, B. C]→Root[A, C]. Once bindings are determined, the example action may be thought of as the "delete B" action.

The method 900 may be employed in an environment for variable binding. Such variable binding may determine a correspondence between structural types in a programming language, a database schema, an XML schema, or the like, and actual values which correspond to the variables defined within the types or schema.

The instructions of method 900 may also comprise matching conditions and may comprise semantic actions. The instance data of method 900 may comprise XML schema instances, may comprise instances of data contained within a database according to a particular database schema, or may comprise data defined or stored in accordance with structural types defined within a programming language.

The method 900 may also include compiling query expressions and determining the result of the query expression corresponding to the regular tree pattern and the actual instance data. For example, such queries may be data base queries such as SQL and may be authorization queries such as data access or the like.

It should be noted that all the methods and techniques described herein may be realized in various embodiments which may comprise (but are not limited to) methods executing within computing environments, computer program products which comprise computer-executable code for performing the methods and techniques described herein, and computing systems comprising computer processors and computer-executable code for performing the methods and techniques described herein.

A more detailed and thorough discussion of methods and techniques of embodiments described herein will now follow.

Regular Tree Patterns

Listing 1 describes a syntax that may be used for regular tree patterns. In the grammar of Listing 1, the term Action is a parameter that refers to a language for semantic actions. The terms Name, Variable, and Label are parameters that each provide a set of symbols called an alphabet. As described herein, it may be assumed that variable, pattern name, and label symbols come from distinct alphabets. In addition to these symbols, patterns may refer to base symbols which may include nonpattern types or literal values.

| Listing 1. Regular Tree Pattern Syntax | | |
|---|---|---|
| Definition | → | Name '=' Pattern |
| Pattern | → | Union |
| | \| | A Variable.Pattern |
| | \| | ε |
| Union | → | Rule ('\|' Rule)* |
| Rule | → | Tree Action? |
| Tree | → | Label[Forest?] |
| | \| | Label{Forest?} |
| | \| | Binding Tree |
| | \| | Tree Repetition |
| | \| | Tree ∧ Tree |
| | \| | ¬ Tree |
| | \| | (Tree) |
| | \| | any |
| | \| | Reference |
| Forest | → | Tree \| Forest, Tree |

-continued

Listing 1. Regular Tree Pattern Syntax

| | | |
|---|---|---|
| Repetition | → | * \| + \| ? |
| | \| | [Min . . . Max] |
| Reference | → | Symbol TypeParam? |
| TypeParam | → | (Union) |
| Binding | → | Variable : |

Regular tree pattern definitions only allow recursive pattern references within the context of the nest operator (as described below). Such a restriction on regular tree grammars is employed to prevent regular tree grammars from inducing the full power of context-free string grammars.

The repetition construct, *|+|?, denotes the minimum and maximum number of occurrences permitted for the Tree it modifies. The maximum number of occurrences may be unbounded. The operators *, +, and ? are interpreted as [0 . . . ∞], [1 . . . ∞], and [0 . . . 1] respectively. In other words, A* is read as zero or more As (i.e., [0 . . . ∞]); B+ is read as one or more Bs (i.e., [1 . . . ∞]); and C? is read as zero or one Cs (i.e., [0 . . . 1]). This construct supports patterns that specify unranked tree nodes. An unranked tree node may have any number of children.

The any wildcard matches any value. The ¬ operator complements a tree pattern. The ^ operator denotes the intersection of a pair of tree patterns. The | operator denotes the union of a pair of tree patterns. Finally, the Λ P. b operator denotes a polymorphic pattern with body b and with pattern parameter P.

The nest operator L[Forest?] defines an ordered, unranked tree node with label L. Such ordered items are also referred to as sequences. The nest operator L{Forest?} defines an unordered, unranked tree node with label L. Unordered items are also referred to as sets (or multisets). We use the term multiset pattern to refer to patterns of the form L{c} because c matches zero or more multisets of tree nodes. We use the term partially-ordered tree pattern to refer to tree patterns that may specify both ordered and unordered subtrees.

Partially-ordered tree patterns enable programmers to concisely express ideas that are tedious or impossible to express using strictly ordered or unordered tree patterns. For example, a process model checking application is described below that includes the transformation rule defined in Listing 2.

Listing 2. A Process Interaction Rule

```
par{sender:choice{seq[send[x:any],CS:any],any*},
    receiver:choice{seq[recv[x:any],CR:any],any*},
    procs:any*}
==>
par{CS,CR,procs}
```

The multiset pattern with label par models a collection of processes executing in parallel. Each node labeled choice models a process that will continue by choosing among a set of alternatives. Each node labeled seq indicates a sequence of processes. Finally, send[x] and receive[x] correspond to sending and receiving a message of type x.

The rule models an interaction among a pair of processes (bound to variables sender and receiver in the pattern). The sender process sends a message of type x and the receiver process receives this message. After the interaction the collection of parallel processes contains the continuation of sender (CS), the continuation of receiver (CR) and the collection of processes that did not participate in the interaction (procs).

Within a set of parallel processes, there may be multiple pairs of potentially interacting processes and therefore multiple possible outcomes when matching the interaction pattern. The MFA mechanism described below may be used to generate one or more of these outcomes.

Multiset patterns offer more than conciseness. They also enable implementations and particular embodiments to use inherently unordered representations of input collections. Direct use of unordered representations, such as search trees or hash tables, enables transformation engines to avoid building separate indices for input collections.

For example, an authorization logic implementation described below is evaluated that checks that an access request meets an authorization policy by matching the request against a database of assertions and a set of rules. The authorization policy application may use a multiset pattern that works directly against an unordered representation of an assertions database.

If multiset patterns and polymorphism are removed from a regular tree grammar, a regular tree type system is arrived at which, as may be appreciated, is similar to a functional programming language for XML tree transformation. Such a system may be employed to generate an algorithm for determining a sub-type relation over nested regular expressions. Such an algorithm uses a top-down approach to compare pattern expressions. The algorithm expands upon and extends previous theoretical work on regular tree expressions. The project reports that it initially used determinization of bottom-up tree automata to decide inclusion, but found that this was not a scalable approach. The determinization algorithm for bottom-up tree automata does not take into account left context when applying its subset construction. This may cause exponential blowup to be far more common than if context were heeded. It will be shown below how modular forest automata use left context to avoid such a pitfall while preserving the simplicity of a direct approach to determinization and sub-typing.

Another embodiment extends the above system with polymorphism, function types, and records. Records require a uniqueness constraint over labels. The MFA implementation described below supports uniqueness constraints, in addition to equality constraints over pattern variables.

As may be appreciated, the ambient calculus operator, n[ ], has a strong correspondence to the regular tree pattern operator Label{Forest?}. It may be demonstrated that the ambient calculus parallel composition operator may be interpreted as a tree composition operator that joins a pair of trees at their roots. It may be proposed that ambient logic may be used as a basis for describing and querying tree structures. Ambient logic is a temporal spatial logic for reasoning about processes. Unlike the regular tree grammar of Listing 1, ambient logic considers only unordered nests. In ambient logic, deciding a sub-type relation is equivalent to deciding implication. This is tractable for some variants of the logic.

XML Schema Language

A Modular forest automata (MFA) implementation is described herein that may successfully be imported and determine sub-type relations for instances of the W3C XML Schema Language. An XSD complex type assigns a name to a structural formula. Structural formulae in XSD are called content models. Content models contain element declarations, an unordered nest pattern called an attribute inventory, and particle compositors. There are three compositors: all, choice and sequence. The regular tree grammar union and concatenation constructors correspond to the choice and sequence compositors, respectively.

The all compositor corresponds to an unordered nest operator which is described herein. XSD places some restrictions on its use of the all compositor. For example, this may require that items within an all compositor have a finite multiplicity.

XML element declarations are isomorphic to the ordered tree constructor, Label[Forest?], of regular tree grammars, with the operator name Label playing the role of the element qname. However, the XML schema language requires that, for any union of two content particles a and b, a parser must be able to perform single lookahead unique particle attribution: reading only one token, a parser must be able to identify whether an instance corresponds to branch a or b of the choice.

Modular Forest Automata

Partially-ordered regular tree patterns have been described, supra.

Modular Forest Automata (MFA) provide a mechanism which provides a unified treatment of ordered and unordered regular tree patterns—of sequences and sets. Such ordered and unordered regular tree patterns are sometimes termed sequences and sets. Each MFA implements a contract that supports analysis and composition of MFA hierarchies. The contract enables MFAs to take advantage of left context during determinization as will be discussed herein. The use of left context in MFAs avoids a possible state blowup which may be found in certain previous methods for determinization of bottom-up tree automata.

Modular forest automata (MFAs) are visibly pushdown automata (VPA). Visibly pushdown automata are a class of pushdown automata as are known to those of skill in the art. For MFAs, a pushdown automaton is defined as a tuple:

$$M = (K, \Sigma, \Gamma, \Delta, s, F) \text{ where}$$

K is a finite set of states
$\Sigma$ is an alphabet (the input symbols)
$\Gamma$ is an alphabet (the stack symbols)
$s \in K$ is the initial state
$F \subset K$ is the set of final states, and
$\Delta$, the transition relation, is a finite subset of $(K \times \Sigma^* \times \Gamma^*) \times (K \times \Gamma^*)$ The transition relation maps triples (current state, input symbols, stack symbol to pop) to pairs (new state, stack symbol to push).

To support analysis, MFAs adopt the stack use restrictions of visibly pushdown languages (VPLs). This class of languages are defined using pushdown automata that restrict their transition relation to conform to one of the three pushdown transition categories in Listing 3:

| Listing 3. MFA Transition Categories | |
|---|---|
| Local | $(q0, a \in \Sigma_l, \epsilon) \rightarrow (q_1, \epsilon)$ |
| Call | $(callSite, a \in \Sigma_c, \epsilon) \rightarrow (callTarget, callSite)$ |
| Return | $(returnSite, a \in \Sigma_r, callSite) \rightarrow (continuation, \epsilon)$ |

These categories partition $\Sigma$ into three disjoint sets: $\Sigma_c, \Sigma_r, \Sigma_l$, corresponding to symbols that can cause call, return, and local transitions, respectively. Local transitions are identical to transitions in regular finite automata. A call transition from a state $q_0$ in MFA $M_0$ reads a symbol a, saves callSite on the stack and transfers control to a state callTarget. A return transition pops callSite from the stack and makes continuation the current state.

The stack discipline described above enables a VPL to remain closed under intersection and complementation in addition to the union, renaming, Kleene star, and concatenation closure properties of pushdown automata. Unlike for general non-deterministic context-free languages, the class of non-deterministic VPLs is equivalent to the class of deterministic VPLs.

Each MFA M has a set T of call target states. M's start state s is in T as is any state reachable from s by a path that ends with a call transition. M can be viewed as a hierarchy of disjoint sets of states called modules. M has one module for each state $t \in T$. Given a call target state t, the corresponding module Module(T) is the set of states reachable from t using only local transitions.

It is required that a module contain only one call target state t. The call target state t is called the entry point of the module. Correspondingly, MFAs cannot contain call transitions whose target state is reachable by local transitions from another call target state. The module containing an MFA's start state is called the MFA's top-level module. In order to maintain the stack discipline, MFAs do not allow inter-module $\epsilon$-transitions.

Finite additional bookkeeping is used with MFAs to apply the call/return strategy of VPA to unordered nest patterns and to obtain a single sub-typing method that can apply to both ordered and unordered nest patterns.

Each MFA state is labeled with a bit vector that indicates that zero or more pattern equivalence classes are accepted by the state. This label is called a tag. Each MFA includes a mapping Tag: $K \rightarrow B$, where B is a string of k bits. For a given module M, k is constant and k is called the tag-length of the module M. For each final state f in F, Tag(f) must contain at least one non-zero bit.

The purpose of tags is to guide how a calling MFA continues upon return from a call. In MFAs, return transitions do not have a fixed target state. Instead, a return transition from MFA state s pops the calling state from the stack, pushes onto the stack Tag(s), and changes the current state to the calling state. The calling state then executes a continuation transition that pops the tag from the stack and transfers control to a continuation state.

The addition of continuation transitions to the MFA mechanism does not change the fundamental properties of MFAs because the continuation transitions of MFA with continuation transitions can be eliminated. To eliminate the continuation transitions of an MFA having continuation transitions is done as follows. First, a copy is made for each call site c with call target state t, of the states in Module(t). This copy is called the target module. Then, for each return transition (r; $\alpha \in \Sigma_r$, c)→(c, tag) in the target module, the corresponding continuation transition (c, $\epsilon$, tag)→(continuation; $\epsilon$) is found in the calling module and both transitions are removed. Finally, a return transition (r; $\alpha \in \Sigma_r$; c)→(continuation; $\epsilon$) is added to the target module. Because it is possible to remove the continuations transitions as described above, is may be assumed that MFAs may have continuation transitions.

It may also be assumed that an MFA has access to a stack, called the input stack of forests. Execution of an MFA begins at the MFA's start state with the input stack containing the original input forest. An MFA includes the notion of a current tree. The current tree is some tree in the forest at the top of the input stack. These concepts can be used to map to particular implementations of MFAs. A call pushes the children of a current tree onto the input stack. A return pops the children off the stack.

If only local transitions of a module M are considered, then M is a regular string automaton that recognizes the contents of a forest. As may be appreciated, this may be used to define the class of pushdown forest automata (PFAs). Pushdown forest automata have two sets of states: the forest states $Q_F$ and the tree states $Q_T$. Pushdown forest automata have Entry and Exit transitions that connect disjoint sets of forest states. Pushdown forest automata also have a transition relation Comb that incorporates information from an exit transition and transfers control from a tree state to a forest state.

If tags are removed from MFAs, then PFAs are isomorphic to MFAs. A given PFA P can be converted to the equivalent MFA $M_P$ as follows: For each forest state of P. create a state in $M_P$. Fore each tree state in P, create a state in $M_P$. Copy the entry, exit, combination and local transitions of P directly to $M_P$. These correspond to call, return, continuation, and local transitions, respectively. By splitting each call state c into a forest state and a tree state t and adapting the continuation transition of c to be a combination transition whose initial state is t, then a tagless MFA may be converted to an equivalent PFA.

A preprocessor, Prep(s), may be associated with any MFA state s. Prep(s) must either be set to a valid MFA or to $\bot$. Within a given module all states must share the same preprocessor value. A module whose states have a preprocessor other than $\bot$ is called a preprocessing module. Given an input forest i, a preprocessing module will call its preprocessor on each element of i before processing that element. A preprocessor is used to discriminate among equivalence classes of input. Preprocessors can not be called recursively. Specifically, no state within a preprocessing module prep can initiate a path that contains a transition with target state t such that Prep(t)=prep. Preprocessors may be used to construct an MFA that can match a multiset pattern.

The addition of preprocessing modules does not change the fundamental properties of MFAs. A preprocessing module may be thought of as operating by transforming each of its inputs i to $\Psi[i]$ where $\Psi$ is a reserved label. Preprocessing steps can then be encoded as call transitions on nests labeled $\Psi$.

Also, a semantic action, Action(tr), may be added to any local MFA transition tr. A transition augmented in this way is called an action transition. An MFA with one or more action transitions is called a modular forest transducer (MFT). The ordering of semantic actions may be preserved during MFT determinization.

Translation of Tree Patterns to MFAs

Partially ordered regular tree patterns may be transformed into MFAs. Because the intersection and complementation methods include a determinization step, details of a method for determinization of non-deterministic MFA (NMFA) is provided first.

Construction procedures for building NMFAs from tree patterns differ from other known construction procedures. First, tree patterns include nest operators. Second, tree patterns may contain actions and variable bindings. A pattern compiler in a particular implementation can translate variable bindings to actions. Correspondingly, variable bindings are not treated specially.

Input to an MFA may be a well-formed forest of tree values. A well-formed input forest ends with the end-of-forest symbol, "]". The translation procedure adds to every generated MFA state s a return transition on ].

A union, $M_2=M_0 \cup M_1$ of two NMFAs is computed using the known classic method which is augmented by making adjustments to tags and preprocessors. In the construction, it is assumed that $M_0$ has tags of length $k_0$ while $M_1$ has tags of length $k_1$. $M_2$ would then have tags of length $k_0+k_1$. When a state s of $M_2$ has a final state of $M_0$, then a string of $k_1$ zeros is appended to its tag. Otherwise, when s is a final state of $M_1$, then its tag is shifted left $k_0$ places, filling it with zeros.

To support combination of preprocessing modules, the union construction is modified as follows: When computing $M_2=M_0 \cup M_1$, when the top-level module of $M_0$ has a preprocessor $prep_0 \neq \bot$ and the top-level module $M_1$ has a preprocessor $prep_1 \neq \bot$, then assign to each state in $M_2$'s top-level module the preprocessor $prep_0 \cup prep_1$.

To combine a preprocessing module with a regular module, a preprocessor is synthesized for the regular module. Suppose $prep_0 \neq \bot$ and $prep_1 = \bot$. A preprocessor for M1 is synthesized by first setting prep1 to the union of the set of MFAs recognizing the transition symbols for local transitions of M1. Next, for each call transition $(c, L, \epsilon) \rightarrow (callTarget, c)$ in $M_1$'s transition relation, then set $prep_1 = prep_1 \cup N$ where N is an MFA recognizing a tree labeled L with children recognized by the module whose start state is callTarget.

Nests

Nest operators may be translated whether they are ordered or un-ordered. Given a nest operator with label L and contents c, first create an NMFA for c, called $M_c$, with start state $s_c$. Then create an NMFA, called $M_{nest}$ with start state s, final state f, and transitions $(s, L, \epsilon) \rightarrow (s_c, s)$ (call $M_c$) and $(s, \epsilon, tag_c) \rightarrow (f, \epsilon)$ (continue from call). Finally, incorporate the states of $M_c$ into $M_{nest}$, assigning to each final state $f_c$ of $M_c$ tag $tag_c$ and changing $f_c$ to a non-final state with a return transition $(f_c, ], s) \rightarrow (s; tag_c)$. In this construction, the states of $M_c$ become a module Of $M_{nest}$.

The concatenation operator may be used to translate the contents of ordered nests. Given a pair of NMFAs $M_0$ and $M_1$, the method builds $M_2=M_0, M_1$ by creating a new start state s for $M_2$, creating an $\epsilon$ transition from s to $M_0$'s start state by creating $\epsilon$ transitions from each final state of $M_0$ to $M_1$'s start state and finally by adopting as $M_2$'s final states the final states of $M_1$.

Multiset Nest Contents

The following strategy may be used to generate an MFA that recognizes the contents of an unordered nest.

In general, a multiset pattern may be viewed as having the form $$\text{Label}\{p_1^{[l_1, h_1]}, p_2^{[l_2, h_2]}, \ldots, p_n^{[l_n, h_n]}\}$$

This notation specifies that, for the contents of a multiset nest operator to match an input collection, each pattern element $p_i$ must match at least $l_i$ input elements and may match at most $h_i$ input elements.

Multiset patterns are first transformed to eliminate arbitrary occurrence constraints. Given a multiset pattern P specified as above, a pattern compiler may transform P to an equivalent unit multiset pattern P' as follows.

---

Listing 4. Transform Multiset Patterns

For each element pattern $p_i^{[l_i, h_i]}$ in P,
  a) Add to P' $l_i$ copies of $p_i$.
    Call these copies required pattern elements of P'.
  b) If $h_i$ is infinite, add $p_i$* to P'.
    Call the added pattern an unbounded pattern element of P'.
    Otherwise add $h_i - l_i$ copies of $p_i$? to P'.
    Call these copies optional pattern elements of P'.

---

The pattern compiler next builds a preprocessing MFA called the element MFA which matches the union of the pattern elements $\cup_i p_i$. Third, the pattern compiler builds a permutation MFA. The permutation MFA calls the element MFA as a preprocessor on its inputs. On each call, the element MFA returns a tag indicating which of the $p_i$ matches the current input. The permutation MFA changes state when it encounters an input that matches a required or optional pattern. The state change counts the required or optional pattern. When the permutation MFA encounters an unbounded pattern, it loops back to its current state.

Figure 2:
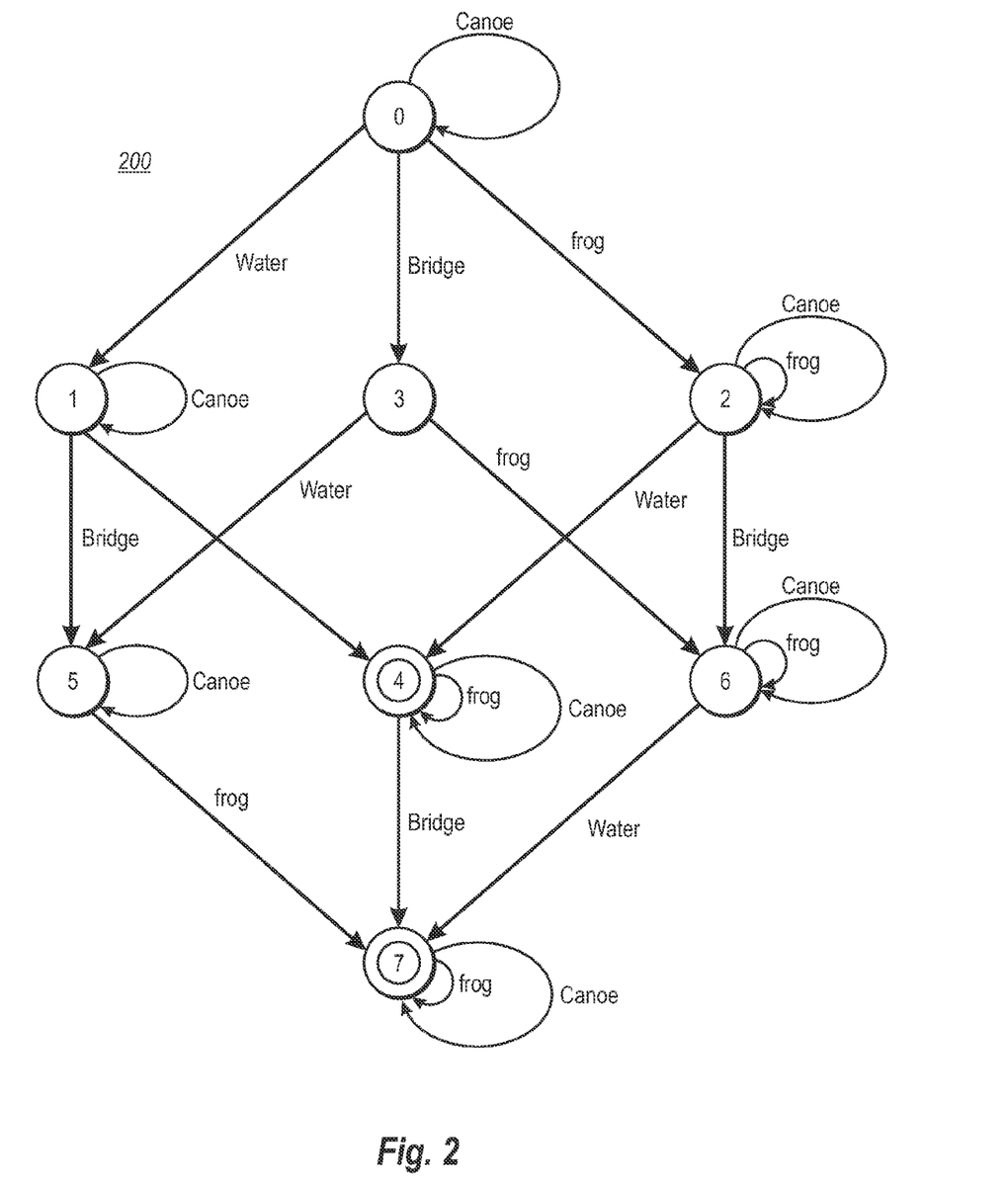
FIG. 2 illustrates a permutation modular forest automata for Nest contents of a pattern.

It may be recognized that permutation MFAs are a form of counting automata. Permutation MFAs differ from other counting automata in their use of a preprocessor step. FIG. 2 illustrates how permutation MFAs count their inputs. The MFA 200 illustrated in FIG. 2 matches the nest contents of the following pattern:

Pond=Pond{water,frog+,canoe*,bridge?}

Repetition, References and Type Parameters

To translate the repetition constructs of Listing 1, a pattern compiler uses well-known techniques. This construction may be augmented to implement variable bindings that accumulate input items matching a repeated pattern.

To translate symbol references, a pattern compiler must distinguish among several classes of symbols. A base type or literal symbol sym translated as a single local transition on sym A reference to a type parameter param translated as a formal transition on param. Formal transitions are not executable. A compiler may generate a parameterized module containing a formal transition, but to create an executable module it must instantiate the parameterized module by supplying actual patterns for the module's formal transitions. During instantiation, the compiler substitutes for each formal transition the translation of the corresponding actual pattern.

A pattern compiler translates a reference to a pattern P by substituting the translation of P into the context that referenced P. As may be known, regular tree grammars do not permit recursive references outside the context of a next operator. A pattern compiler can combine this property with the invariant that nests are compiled as calls to ensure that all inline expansions will reach a base case, such as a nest operator or a pattern that does not contain a pattern reference.

Figure 3:
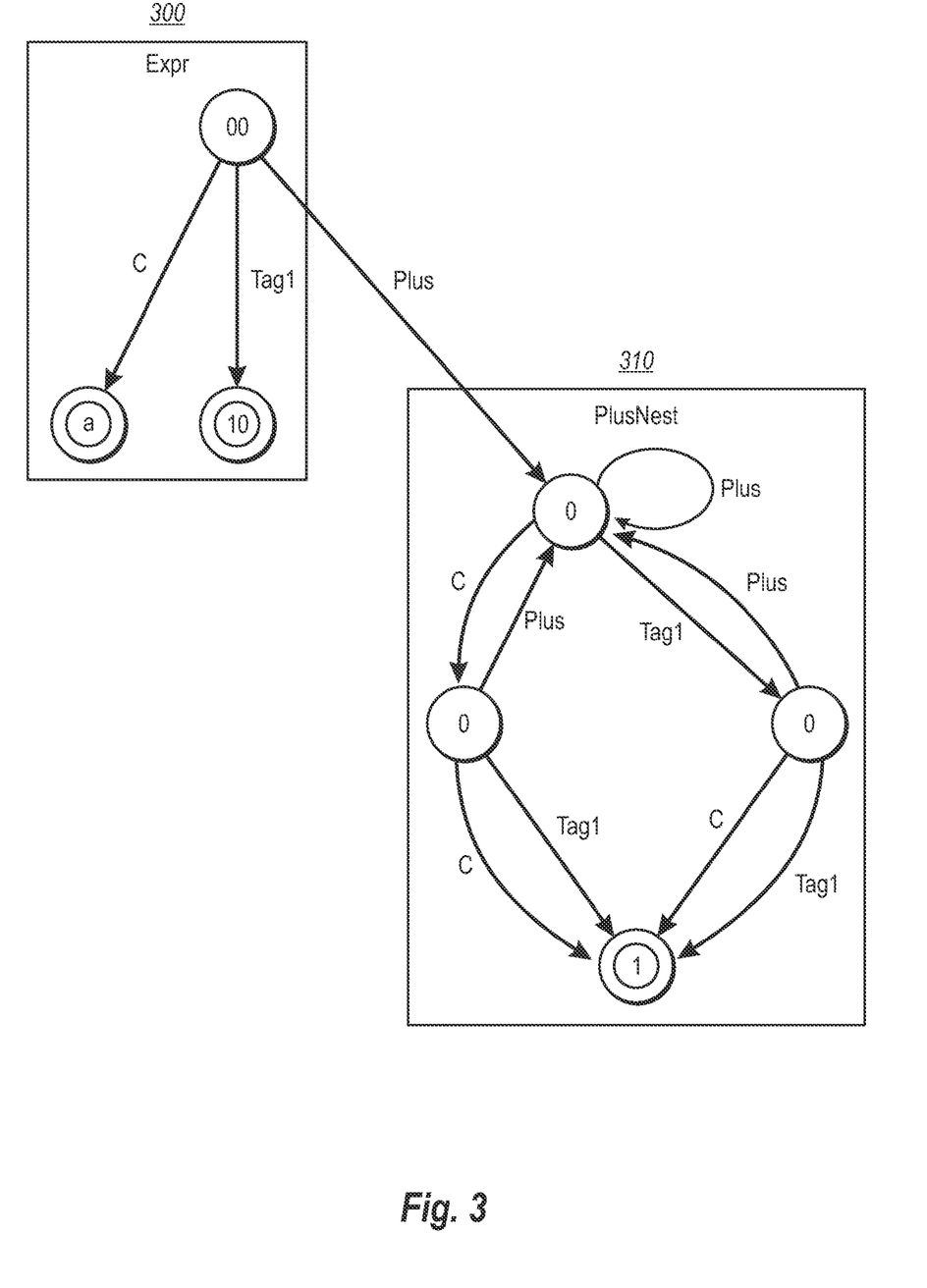
FIG. 3 illustrates a determinized translation of a particular pattern Expr.

For example, FIG. 3 illustrates the translation for the recursive pattern

Expr=c|plus[Expr,Expr].

FIG. 3 labels each node with its tag. FIG. 3 contains two modules, depicted 300 and 310, which are called Expr 300 and PlusNest 310. Expr 300 has a tag length 2 because it matches a union. PlusNest 310 has a tag length 1. Module Expr 300, which includes the start state for the MFA, matches the Expr pattern by either matching a c or by calling PlusNest 310 and then continuing to the final state tagged 10 upon return of tag 1 from PlusNest. PlusNest 310 matches the pattern fragment [Expr, Expr] by concatenating two inlined instances of the pattern Expr. These inline expansions of Expr yield recursive calls to PlusNest. Return transitions or paths that lead to non-final states are not shown.

Determinization

Listing 6. Determinization of NMFAs

0. Given NMFA M = ( K, Σ, Γ, Δ, s, F), compute deterministic MFA
   M' = (K' ⊆ $2^K$, Σ', Γ', Δ', s, F').
1. s' = E(s);
   Q = [ ];
   Enqueue(Q, s');
2. while Q ≠ [ ]
   a) t = Dequeue(Q);
   b) for each sym in $Σ_1$
   i. moveSet = the set of all states r such that
      ∃x ∈ t: (x, sym, ε) arrow (r, ε) in Δ;

Listing 6. Determinization of NMFAs
-continued ii. u = E(moveSet);
   iii. if u ∉ K' then Enqueue(Q, u); K' = K' U {u};
   iv. add(t, sym, ε) → (u, ε) to Δ';
   c) for each L in Labels(t)
      i. combineNests( t, L, K', Q, Δ, Δ');
3. for each state st ∈ K'
   a) if st ∩ F ≠ ∅ then F' = F' U st;
4. for each state f ∈ F', Tag(f) = U+$_{x∈f}$ Tag(x).
   (The operator U+ computes the bitwise OR of a set of tags.)

Listing 6 provides a construction for determinizing an MFA. To simplify determinization, represent the combination of a call transition (c,Label,ε)→(callTarget,c)

and its associated continuation transition (c,ε,tag)→(cont,ε)

as an intra-module transition called a nest transition:

(c,(Label,callTarget,tag),ε)→(cont,ε).

This representation enables the determinization method to process transitions uniformly because both local and nest transitions are intra-module transitions. For use in the determinization method of Listing 6, the function Labels(s) is introduced which yields the set of labels used in nest transitions emanating from s.

For a given top-level module M, the determinization method adds the following two steps to the class method for determinization of an NFA. First, step 2.c uses the CombineNests method to combine the call targets of nest transitions from state t. Second, step 4 updates the tags for each final state in the determinized MFA's set of final states F'. For a given final state f, step 4 sets the tag for f to the bitwise OR over the tags of the NMFA states that are members of f.

The determinization method uses as a subroutine the ε-closure operator E(s). Given a state s, E(s) is the set of states reachable from s by a path containing only ε transitions. For clarity, Listing 6 omits the details related to handling wildcard transitions. For implementing wildcard transitions emanating from a state t, the move set for the wildcard transition is combined with the move set of each non-wildcard transition emanating from t.

Sub-Typing

Having invested in extra bookkeeping during determinization to keep track of tags, a benefit of the extra bookkeeping may be reaped in comparing a pair of MFAs $M_0$ and $M_1$. A procedure for comparing the MFAs is given in Listing 7.

Listing 7. MFA Comparison Algorithm.

0. Given a pair of MFAs $M_0$ and $M_1$, determine the inclusion
   relationship between the sets of values recognized by $M_0$ and $M_1$.
1. for each state q in $M_0$ or $M_1$,
   if Tag (q) ≠ 0 then set Tag(q) = 1;
   otherwise set Tag(q) = 0;
2. Set $M_2$ = $M_0$ U $M_1$.
   (e.g., The union construction assigns to final states of $M_0$ the tag 01
   and assigns to final states of $M_1$ the tag 10)
3. Set C to the set of distinct tags on final states of Determinize($M_2$).
   Find the relationship between $M_0$ and $M_1$ by looking up the value of
   C in Table 1.

Figure 5:
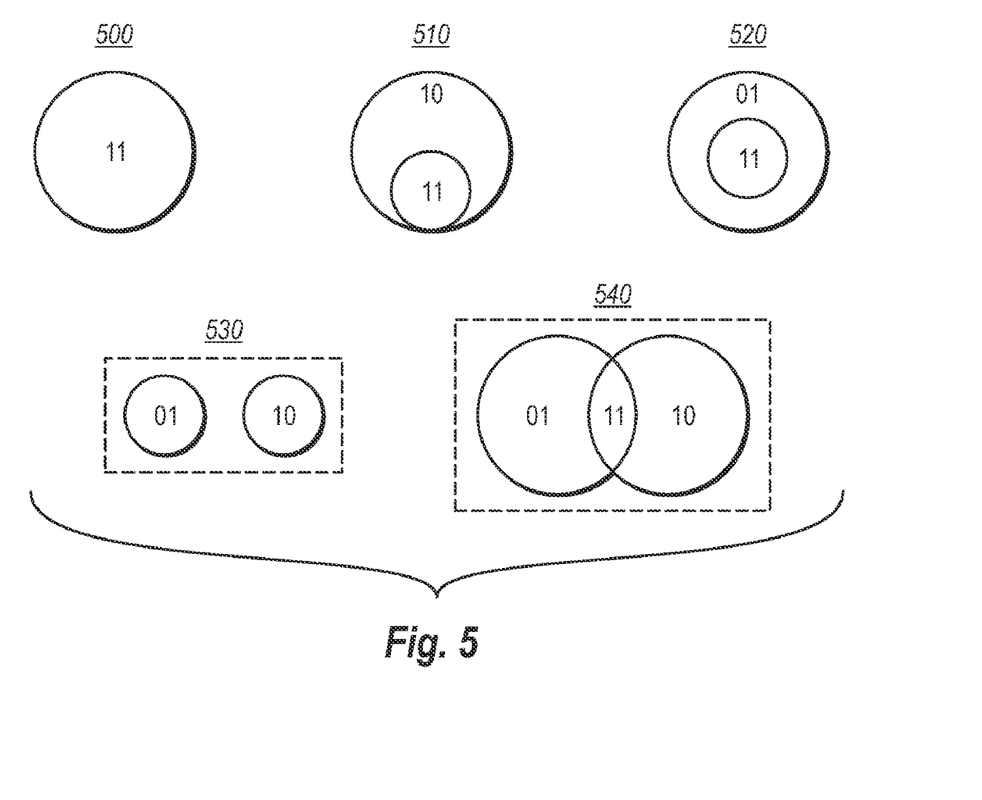
FIG. 5 illustrates a graphical representation of the various sub-types determined in sub-type analysis.

A key idea is that the determinization procedure keeps track, through tags on final states, of whether $M_0$ and $M_1$ may ever be accepted simultaneously and whether $M_0$ or $M_1$ or both may ever be accepted independently of each other. Table 1xxxx can be used to map to a comparison outcome the set C of tag values present on final states in the determinized union of $M_0$ and $M_1$. FIG. 5 is a graphical illustration of the possible sub-type relationships listed in Table 1.

TABLE 1

Using Tags to Compare MFAs

| Value of C | Interpretation | Semantics |
|---|---|---|
| {11} | equivalent | $M_0 = M_1$ |
| {10, 11} | sub-type | $M_0 \subset M_1$ |
| {01, 11} | super-type | $M_0 \supset M_1$ |
| {01, 10} | disjoint | $M_0 \cap M_1 = \emptyset$ |
| {01, 10, 11} | intersecting | $M_0 = M_1 \neq \emptyset$ |

FIG. 5 depicts each of the equivalent 500 relationship; the sub-type 510 relationship; the super-type 520 relationship; the disjoint 530 relationship; and the intersecting 540 relationship.

Complementation, Intersection, and Difference

Additional benefits may be reaped from the tag bookkeeping described above. Tags may be used to implement procedures for complementation, intersection, and difference of MFAs. To construct the intersection $M_0 \hat{\ } M_1$, the intersection construction first computes the determinized union I=Determinize($M_0 \cup M_1$) and then eliminates from I each state t from which a final state with tag 11 is not reachable.

When this computation results in an MFA I with no states, a single non-accepting start state is added to I so that I is the MFA that accepts no input.

A similar construction may be used to compute $M_0-M_1$. To do so the tag 01 is substituted for tag 11 in the above intersection construction. To compute $M_1-M_0$, the tag 10 is used in the construction.

To build ¬M, the complement of M, the complementation construction first computes M'=Determinize(M). Then, for each final state f in M', the construction sets the tag of f to 0 and marks f non-final. For each non-final state nf of the original M', the construction sets the tag of nf to 1 and marks nf final. The tag-adjusted M' accepts ¬M.

An important aspect of this construction is that transitions on zero tags returned by called modules may lead to final states. An MFA implementation that saves space by using implicit transitions on zero tags must have a way to convert these transitions to explicit transitions upon complementation.

Ordering of Semantic Actions

One benefit of particular embodiments of the present invention is to enable a pattern compiler to place a semantic action on any NMFA transition. To support this flexibility, a method is required for preserving the order of semantic actions during determinization. It is beneficial to preserve the property that, for all paths [$tr_1$, $tr_2$, ..., $tr_n$] of an NMFA M, Action ($tr_i$) is executed before Action($tr_j$) if and only if i<j. To preserve this property, the paths of M are associated with the transitions of Determinize(M).

To accomplish this, a basic path of a deterministic MFA $$M'=\text{Determinize}(M)$$

is defined as a sequence of local or nest transitions [$tr_1$, $tr_2$, ..., $tr_n$] such that for each transition $tr_i=(q_i, \text{sym}, \epsilon) \rightarrow (q_{i+1}, \epsilon)$, either $q_{i+1}$ has only one incoming transition, i=0, or i+1=n. For purposes of this definition, the start state of M' is considered to have an implicit incoming transition.

The basic paths of M' may start and finish with a state that has multiple incoming transitions. However, any intermediate states along a basic path must have exactly one incoming transition. A consequence of this property is that the final transition $tr_n$ of a basic path uniquely identified that path.

This consequence is made use of by assigning to the final transition $tr_n$ of each basic path bp a set A of sequences of semantic actions gathered in order from the set np of NMFA paths that correspond to bp. When an MFT executes transition $tr_n$ of bp, it also executes each member of A.

For a given basic path bp of M', the corresponding set of paths np from M are found using the following method. First, find, for each transition $tr_i$ in bp the NMFA transitions that correspond to $tr_i$. A NMFA transition $$ntr=(r_i,\text{sym},\epsilon) \rightarrow (r_2,\epsilon)$$

corresponds to $tr_i$ if and only if $r_1 \in qi$ and $r_2 \in q_{i+1}$.

For each NMFA transition corresponding to $tr_i$, an NMFA path may be built $npath_i=path_a$, ntr, $path_b$, where $path_a$ has the following properties. First, $path_a$ is made entirely of $\epsilon$ transitions whose beginning and ending states are in $q_i$. Second, the first state of $path_a$ has no predecessor in qi. Finally, the last state of $path_a$ is the beginning state of transition ntr. Similarly, $path_b$ is made entirely of $\epsilon$ transitions whose beginning and ending states are in $q_{i+1}$, and $path_b$ begins with the ending state of ntr.

In turn, the NMFA paths are built corresponding to basic path bp by stringing together all of the sub-paths that correspond to some transition in bp. If each transition of bp has only one corresponding NMFA transition, these sub-paths will form a single NMFA path. However, if some transitions of bp have more than one corresponding NMFA transition, then the sub-paths are combined by joining pairs ($npath_a$, $npath_b$) of NMFA sub-paths for which the last state of $npath_a$ is the first state of $npath_b$. A given NMFA sub-path may participate in more than one such pair; therefore several of the NMFA paths corresponding to a given basic path may share a common prefix.

Figure 6:
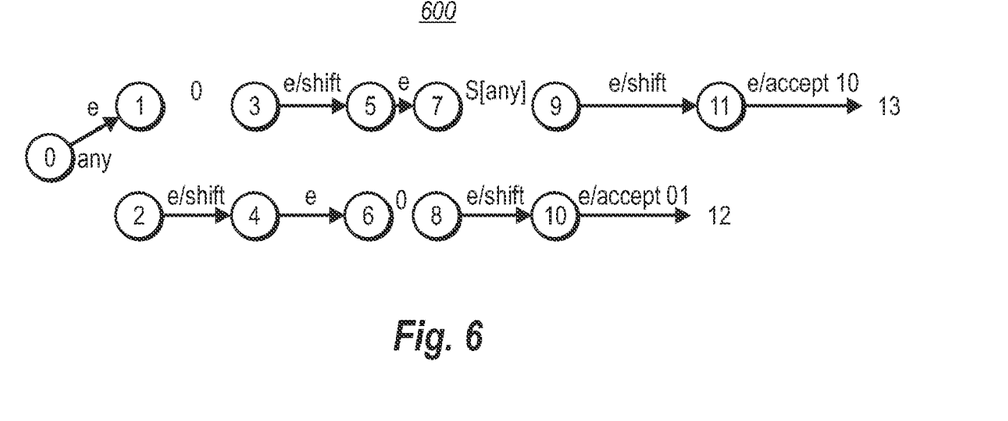
FIG. 6 illustrates a non-deterministic modular forest automata for the nest contents of a pattern GTE.
Figure 7:
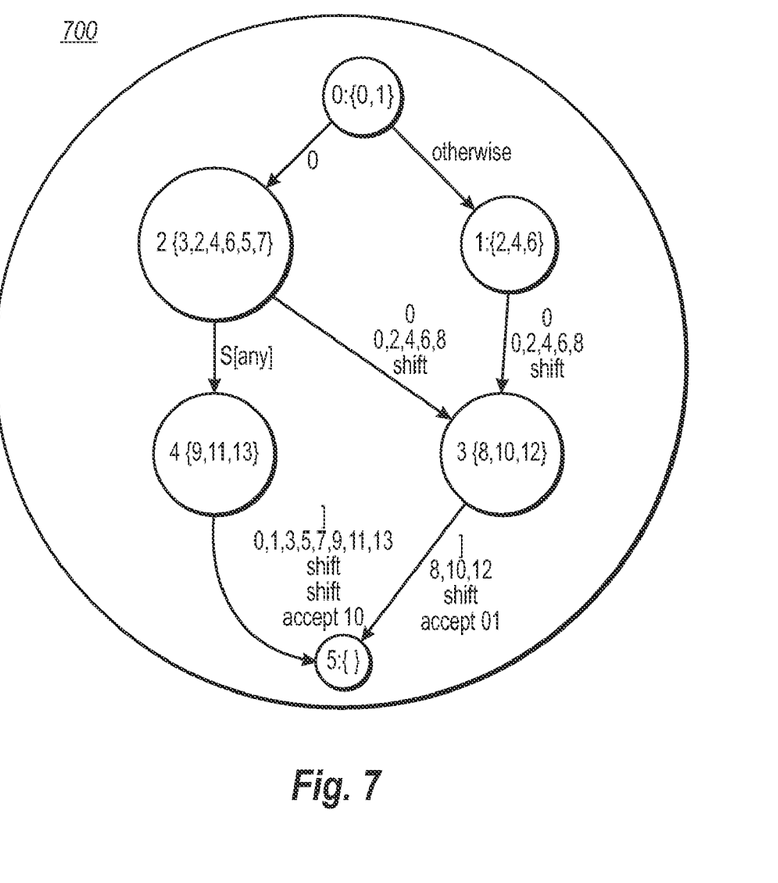
FIG. 7 illustrates a determinized modular forest automata for the nest contents of a pattern GTE.

FIGS. 6 and 7 show the correspondences between the constructed NMFA 600 for the nest contents of the pattern GTE=GTE[any,0]|GTE[0,S[any]]

and its determinized equivalent 700, respectively. The MFAs in these figures include the shift and accept actions described in Table 2. FIG. 6 uses the symbol e to represent an $\epsilon$ transition. FIG. 7 illustrates how the action sequences 700 from each of the NMFA paths have been gathered and assigned to transitions that finish basic paths of the determinized MFA. These transitions are also labeled with the NMFA paths assigned to them.

FIG. 7 also gives a view of the translation for the wildcard any. The determinized MFA for GTE uses a transition labeled otherwise to translate the wildcard. This translation is called a default transition because it will be executed if no other transition applies. The target state t of a wildcard transition starting from state s is added to the move set for default transition from s. In addition, t is added to the move set of any non-wildcard transition from s.

Finally, FIG. 7 illustrates a technique for representing return transitions that simplifies the ordering of semantic actions. Return transitions may be viewed as local transitions on end-of-forest(]). These local transitions can then become placeholders for semantic actions. The pattern compiler described herein makes use of this technique.

Optimization of Permutation MFAs

To account for differing input orders, permutation MFAs may have a large number of transitions. To reduce the number of transitions in a permutation MFA, a pattern compiler can assign a partial order, called the tag order, to the tags of the corresponding element MFA. The compiler can then remove from the permutation MFA paths that are out of order, anticipating that the runtime system will match an input forest using one of two strategies. First, a runtime system can use can index over the input collection to extract items that will match required pattern elements. Second, the runtime system can use the element MFA to preprocess the input forest and then sort the result according to the element MFA's tag order.

The first strategy works well when one of the pattern elements is the wildcard any*. In this scenario, the runtime system can "cherry pick" the required pattern elements in tag order using an index and then assign the remaining input forest items to the wildcard pattern element.

The second strategy trades reduced memory use for potentially increased matching time due to sorting. When used to transform labeled, directed graphs, permutation MFAs may typically bind to variables large chunks of an input forest. Further, a user of multiset patterns may expect multiple sets of variable bindings to emerge from a matching operation. In these scenarios, a runtime system must retain a copy of an input forest and therefore supports sorting.

Given a set P of pattern elements, a total order for the tags of the corresponding preprocessor MFA may be derived as follows. First, order the pattern elements. Given a pair of pattern elements $(p_i, p_j)$ both in P, define $p_i < p_j$ if $p_i$ is required and $p_j$ is not, or if $p_i$ is optional and $p_j$ is unbounded, or if $p_i$ has a higher priority than $p_j$. If no priorities are assigned then assign priorities lexicographically, so that there is a total order among the pattern elements.

Figure 4:
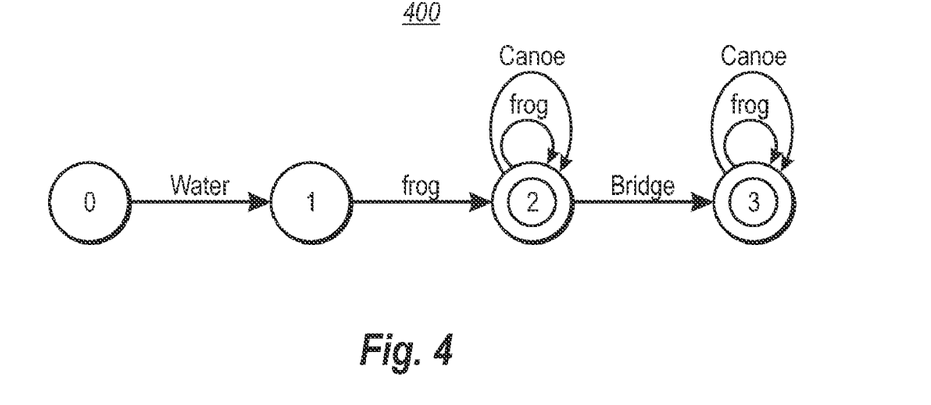
FIG. 4 illustrates an optimized modular forest automata for nest contents of a pattern Pond.

Upon Determinization, a preprocessor MFA will have tags that indicate acceptance of a set of one or more pattern elements. Given a pair of such tags $(t_i, t_j)$, $t_i < t_j$ if $\min(t_i) < \min(t_j)$. If $t_i$ and $t_j$ have the same minimum element, the $t_i < t_j$ if $|t_i| > |t_j|$. This last rule ensures that permutation MFAs consider first inputs that may match several pattern elements. FIG. 4 illustrates the effect of tag order optimization on the MFA 400 for Pond pattern Pond=Pond{water,frog+,canoe*,bridge?}.

MFA Implementation

In one particular implementation of MFAs and MFTs, there is a runtime system that implements instances of these automata called transducers. In another embodiment, a pattern compiler transforms regular tree patterns to transducers, augmenting transducer transitions with instructions that implement variable binding, matching conditions and semantic actions. Particular embodiments may be applied to at least four applications: claims-based authorization service, a protocol model-checking application, a system for importing, subtyping, and matching XML schema instances, and a compiler for query expressions.

An actual evaluation of a particular implementation resulted in a transducer runtime matching labeled, directed graphs at a rate between 2.4 and 8.9 million nodes per second. Further, the transducer runtime was able to transform labeled, directed graphs at a rate between 0.6 and 2.1 million nodes per second.

Runtime

For Each Transformation Rule rule=pattern,action a pattern compiler creates a frame template. The frame template specifies a slot for each variable bound in rule, plus an additional slot to hold the result of applying action. At runtime, the transducer mechanism may allocate for each rule r a stack of frame collections. A frame collection for rule r contains zero or more frames whose layout is described by the frame template for f Frame collections may contain more than one frame because a multiset pattern can match its input in more than one way, yielding multiple sets of variable bindings. Frame collections may be stacked to handle recursion.

Transducer Instructions

TABLE 2

Transducer Instructions

| Instruction | Interpretation |
|---|---|
| Bind r.x | Assign the current item to r.x |
| Unify r.x | Unify the current item with r.x |
| Init r.x | Assign to r.x the empty collection |
| Accum r.x | Combine the current item with the collection found in r.x |
| Exec r, i | Execute the action associated with rule r. Using the resulting value as the current item, execute instruction i. Pop the rule collection stack for r. |
| Push r | Push onto the rule collection stack for r a new rule collection. |
| Accept t | Accept the set of rules coded by tag t. |
| Par b | Execute a set of action blocks b in parallel. The pattern compiler uses this instruction when more than one NMFA path corresponds to a DMFA transition. |
| Shift | Move the input pointer to the next forest item. |

Transducer state transitions may refer to action blocks which are sequences of transducer instructions. The transducer instruction set includes the instructions given in Table 2. In Table 2, operands labeled r reference grammar rules. Operands labeled r.x reference the slot for variable x within the rule frames on top of r's rule collection stack. Operands labeled i refer to instructions. Operands labeled t refer to tags indicating sets of accepted rules. Operands labeled b refer to a set of action blocks.

In addition to the explicit operands, instructions may also contain a shift type and a shifted rule. The shift type indicates how the transformation engine should move to the next item in the forest. If the shift type is SHIFT NEST, then the transformation engine will rewrite the successors of the current tree node before moving on to the next tree node. The shifted rule indicates which rule to rewrite (among several that the nest pattern may have matched).

The first four instructions in Table 2 are called the frame update instructions because for some rule r, they update for each frame on r's collection stack, the slot for variable r.x.

The Exec instruction pops the top collection from r's collection stack. For each frame in the popped collection, the Exec instruction executes the rewriting action associated with r. For each result, the Exec instruction executes the frame update instruction i which updates some variable target.x. In recursive cases, target may be the same rule as r.

The Push instruction pushes a new rule collection onto the rule collection stack for r. The Par instruction executes a set of action blocks in parallel. For each action block in the set, the par instruction starts with the current input node. Each action block in the set must advance the input pointer the same amount. The transformation engine does not always execute each member of a parallel block. Each parallel block member may be marked with a rule identifier. The transducer will only execute parallel block members that are marked with an identifier for a rule that the transducer is currently rewriting.

The Shift instruction advances the transducer to the next input item. The pattern compiler generates this instruction when there is no variable binding associated with the current pattern position. When a pattern position does have a variable binding, the compiler instead supplies the shift information as part of a frame update instruction.

Applications

One particular authorization policy engine (called Thor) uses an authorization logic that supports claims-based authorization of data access requests. Thor comprises a large database of claims, expressed in logic such as claim: a/dns=?x–>b/dns=?x, which denotes that if a claims that the property dns has the value bound to variable x, then b makes the same claim. The claim a/dns="LocalHost" denotes that a claims that the property dns is assigned the value "LocalHost." All such claims are represented in the claims database as an unordered table, indexed by principals and properties.

The authorization policy engine uses a structural contract to represent its claims database as an unordered forest. To process a claim, it first converts the claim into a tree of the form prove[context{database}, goal]. Then the engine uses a set of rules to repeatedly transform the claim until it reaches a fixed point. If the engine can prove the claim, the claim will then be transformed into a proof tree that identifies the steps in the proof The pattern compiler may translate the engine's rules into a transducer. The search procedure calls this transducer to execute each transformation step. The rules implement a sequent calculus for constructive logic, augmented with distribution rules for the delegation operator. A typical rule in this logic is the following:

```
ImpliesConditionMet =
    prove[
        context{typedTerm[proof1:andy, a:any],
            typedTerm[proof2:any, implies[a:any, b:any]],
            rest:any*},
        goal:any]
    ==>
    prove[
        context{rest,
            typedTerm[proof1:any, a:any],
            typedTerm[apply[proof2:any, proof1:any], b:any]},
        goal:any];
```

The engine uses the indexing and tag order sorting previously described herein to achieve a substantial throughput (measured in one instance as 23,000 claims per second). This has a possible benefit of preventing claims processing from being a rate-limiting step of an overall authorization service.

Another application is a process model-checker. Such a model-checker may be applied to protocols ranging from simple alternating-bit protocols to a model of TCP (transmission control protocol). The model-checker may check deadlock-freedom for such protocols. The model-checker uses patterns, such as the interaction pattern of Listing 2, that produce many results. In such cases, the transducer may buffer several frames worth of variable bindings for each rewrite.

Another embodiment applies an application which imports, validates, and sub-types XML schemas. This embodiment imports XML schemas into partially-ordered tree patterns. Such an application may operate in both batch mode and in interactive mode. In interactive mode, the application may be employed as part of an authoring system for incorporating patterns into computer applications.

Yet another embodiment was applied in a compiler component for query expressions. Such a component may be used as a front-end for database query applications such as SQL and the like. The component uses a set of rules to translate a query expression Q into a comprehension algebra and then optimizes Q by using a second set of rules that transform the algebraic representation to a fixed point.

Optimizations of the embodiments described herein are also possible. For example, a pattern compiler may recognize dependencies among bound variables and use those dependencies to drive matching. The compiler may use this optimization on the pattern for implication given above. By first extracting from the input forest input items that match the pattern element typedTerm[proof2:any, implies[a:any, b:any]], a generated transducer could constrain the possible matches for the pattern element typedTerm[proof1:andy, a:any].

Modular forest automata provide a unified description of partially-ordered regular tree patterns. MFAs also provide simple algorithms for determinization, sub-typing, intersection, and complementation of these patterns. In practice, modular forest automata support high-performance pattern analysis and matching. Modular forest transducers enable compilers to place semantic actions on any state transition while supporting efficient transformation of labeled, directed graphs.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method in a computer environment for analyzing a regular tree pattern, the computer environment comprising at least one computer processor and computer-readable memory, the method comprising:
    receiving data comprising a regular tree pattern comprising each of at least one sequence and at least one set;
    determining a first machine corresponding to the at least one sequence;
    determining a second machine corresponding to the at least one set;
    creating a union of the first and second machines;
    determining a set of labeled acceptance states for the union of the machines;
    determining from the labeled acceptance states a sub-type relationship for the first and second machine;
    determining a root level machine comprising at least one transition to a labeled nest;
    creating a module corresponding to the labeled nest;
    placing a continuation state corresponding to the return of the labeled nest onto a stack;
    performing actions corresponding to the labeled nest; and
    when reaching an acceptance state for the labeled nest, popping the continuation state from the stack and resuming processing for the root level machine.

2. The method of claim 1 wherein the received data corresponds to data defining structural types in a programming language.

3. The method of claim 1 wherein the received data corresponds to data comprising a schema for a database.

4. The method of claim 1 wherein the received data corresponds to an XML schema.

5. The method of claim 1 further comprising determining whether two data types are equivalent.

6. The method of claim 1 further determining whether two database schema are equivalent.

7. A computer program product comprising a tangible computer-readable storage device having encoded thereon computer-executable instructions for analyzing a regular tree pattern, the computer-executable instructions, when performed in a computing environment, perform a method comprising:

receiving data comprising a regular tree pattern comprising each of at least one of a-sequence and at least one set;

determining a first machine corresponding to the at least one sequence;

determining a second machine corresponding to the at least one set;

creating a union of the first and second machines; determining a set of labeled acceptance states for the union of the machines;

determining from the labeled acceptance states a sub-type relationship for the first and second machine;

determining a root level machine comprising at least one transition to a labeled nest;

creating a module corresponding to the labeled nest;

placing a continuation state corresponding to the return of the labeled nest onto a stack;

performing actions corresponding to the labeled nest; and     when reaching an acceptance state for the labeled nest, popping the continuation state from the stack and resuming processing for the root level machine.

8. The computer program product of claim 7 wherein the received data corresponds to data defining structural types in a programming language.

9. The computer program product of claim 7 wherein the received data corresponds to data comprising a schema for a database.

10. The computer program product of claim 7 wherein the received data corresponds to an XML schema.

11. The computer program product of claim 7 further comprising determining whether two data types are equivalent.

12. The computer program product of claim 7 further determining whether two database schema are equivalent.

\* \* \* \* \*